United States Patent Office 3,345,268
Patented Oct. 3, 1967

3,345,268
PROCESS OF PURIFYING A TRANSGLUCOSIDASE AND GLUCOAMYLASE-CONTAINING FUNGAL ENZYME PREPARATION
Julian Corman, Muscatine, Iowa, assignor to Grain Processing Corporation, Muscatine, Iowa, a corporation of Iowa
No Drawing. Filed Aug. 3, 1964, Ser. No. 387,190
21 Claims. (Cl. 195—31)

This invention relates to the treatment of starch hydrolyzing enzyme preparations and to an improved enzymatic process for the production of hydrolyzates of starch and starch products having exceptionally high dextrose content.

Although the presence of starch hydrolyzing enzymes is widespread within the plant and animal kingdom, sources of microbiological origin are used most commonly in industry in the enzymatic saccharification of liquefied starch to form dextrose-containing syrups. The culture filtrates of *Aspergillus phoenicis, Aspergillus diastaticus, Aspergillus usamii* and *Aspergillus niger* produce excellent enzyme systems which hydrolyze liquefied starch to dextrose. Cultures of *Aspergillus niger* are particularly advantageous.

The broth resulting from the fermentation of these organisms generally contains several enzymes having different activities, some of which interfere with the production of dextrose when the enzyme preparation is employed to hydrolyze starch. Thus, for example, in the culture broth of *Aspergillus niger* three predominent enzyme systems have been identified, namely, alpha-amylase, glucoamylase (amyloglucosidase) and transglucosidase. Alpha-amylase attacks gelatinized starch by a random type splitting of the starch molecule, thus causing a desirable reduction in viscosity of the gelatinized starch dispersion. This dispersion contains a linear fraction from amylose of polymerized dextrose attached in the alpha-1,4-positions and a branched polymer from amylopectin which also contains alpha-1,4-linkages but in addition has branched positions adjoining with alpha-1,6-linkages.

In contrast to the multi-chain action of alpha-amylase, the action of glucoamylase is thought to be a "single-chain" action where an enzyme molecule attaches to the dextrain and detaches one glucose unit at a time from the dextrin chain and thus theoretically converts the starch quantitatively to dextrose. The action of glucoamylase on dextrin polymers is much more specific at the alpha-1,4-glucosidic bonds than the alpha-1,6-glucosidic bonds in that it will cleave the former type bond approximately 30 times as fast as the latter type bond. One unit of glucoamylase is capable of saccharifying soluble starch at a rate equivalent to one gram of dextrose per hour at 60° C. and pH 4.3 provided that not more than 25 percent of the substrate is saccharified during the assay.

The presence of transglucosidase with glucoamylase in enzyme preparations detracts from the potential yield of dextrose in the hydrolyzate. Transglucosidase is known to catalyze transglucosylation reactions between dextrose, maltose and other intermediate saccharified products. As a result, upon completion of the saccharification reaction saccharides other than dextrose are still present in substantial amounts.

Accordingly, it is highly desirable to separate the desired glucoamylase enzyme from other enzymes, principally transglucosidase, present in fungal enzyme preparations which, in the hydrolysis of starch, interfers with the formation of dextrose.

The present invention provides a process for purifying glucoamylase-containing fungal enzyme preparations to inactivate enzymes which, in the hydrolyzation of starchy materials, interfere with the production of dextrose. The present invention also provides a process for hydrolyzing starch to obtain high yields of dextrose by subjecting a liquefied starchy material to the action of a purified glucoamylase-containing fungal enzyme preparation from which there has been removed those enzymes which interfere with the production of dextrose.

In accordance with the present invention a glucoamylase-containing fungal enzyme preparation is purified by treating an aqueous dispersion thereof at a pH within the range from about 1.5 to about 4 with a polysaccharide having anionic functional groups, the treatment being carried out for a period of time to effectively inactivate the transglucosidase. Generally, the selective inactivation of transglucosidase is accompanied by precipitation or coagulation of the undesired enzymes but the desired inactivation also occurs without precipitation. After treatment the aqueous fungal enzyme preparation can be filtered or centrifuged to remove undissolved solids therefrom with the desired glucoamylase remaining in the filtrate, although this step is not necessary since the treated preparation can be used as is as long as the transglucosidase is inactivated.

Adjustment of the pH to within the range specified is a critical feature of the invention in order to achieve the desired inactivation and removal of transglucosidase activity. It is generally preferred to adjust the pH of the aqueous glucoamylase solution to a value in the range from about 2.0 to 3.0. Adjustment of the pH to a low value can be accomplished with any suitable mineral or organic acid such as, for example, hydrochloric, sulfuric, phosphoric, acetic and the like.

The principal object of the process of the present invention is to effectively remove transglucosidase from the culture broth with minimum loss in glucoamylase activity. To this end the process is carried out at a temperature within the range from about 5 to about 50° C. and preferably at a temperature of from about 20 to about 40° C. for a period of time sufficient to substantially inactivate the transglucosidase. Lower temperatures can be used but they become impractical due to the time required to complete the inactivation and to the added cost of cooling the solution. Likewise, higher temperatures such as, for example, 60° C. or higher can be used but at the higher temperatures inactivation of the desired glucoamylase occurs. The time of treatment can vary from 5 minutes up to several hours or more, the optimum treating time depending upon the pH and temperature at which treatment is conducted. For example, at low temperature and high pH (pH 4) a longer treating time is required than when a high temperature and low pH are employed.

Representative polysaccharide treating agents having anionic functional groups which are suitable for use in the present invention include karaya gum, locust bean gum, carrageenan, algin, pectin, oxidized starch, starch sulphate, starch phosphates, carboxymethylcellulose and the like. The polysaccharide treating agent is preferably employed in the form of an aqueous solution. In general a polysaccharide treating agent is employed in accordance with the invention in an amount ranging from about 0.01 to about 10.0% by weight of the aqueous glucoamylase preparation.

One specific preferred embodiment of the process of this invention is carried out as follows: A glucoamylase-containing fungal enzyme culture filtrate, either with mycelium present or after being filtered to remove mycelium, is adjusted to a pH of about 3. Adjustment of the pH is accomplished by adding an acid such as hydrochloric to the aqueous solution of the filtrate. The temperature of the enzyme liquor is maintained at about 30° C. and the gaseous filtrate agitated for a period of about 120 minutes with a polysaccharide such as karaya gum. After the 120- minute agitation period, the solution is filtered. The treated glucoamylase enzyme preparation, substantially devoid of transglucosidase activity, can be used for starch conversion in this form or it can be concentrated or it can be precipitated by means of a precipitating agent such as alcohol to obtain the glucoamylase enzyme in dry form.

The process of the invention is applicable to the purification of glycoamylase-containing fungal enzyme preparations to inactivate transglucosidase which may be present therein. Accordingly, glucoamylase-containing culture filtrates of *Aspergillus phoenicis, Aspergillus diastaticus, Aspergillus usamii* and *Aspergillus niger* can be advantageously treated by the process of the invention. The process is applicable to crude glucoamylase solutions and to such solutions which have undergone preliminary purification.

Several procedures can be employed to evaluate the effectiveness of the purification treatment. The ultimate test is, of course, the ability of the treated enzyme preparation to hydrolyze starch to produce hydrolyzates having high dextrose contents such as dextrose equivalents (D.E.) of 94 to 98 and above.

The advantages of the invention will be further illustrated by the following specific examples. In these examples enzymes were evaluated for ability to hydrolyze starch. For the hydrolyzate, except where indicated otherwise, a slurry of cornstarch was adjusted to approximately 30% solids level at a pH of 6–7 and liquefied with bacterial alpha-amylase to a dextrose equivalent (D.E.) from about 10 to 32. The purified enzyme is employed in the hydrolysis of starch in an amount corresponding to one glucoamylase unit per 6 grams of starch.

Example I

Sixteen milliliters of 2.5% carageenan solution was added to 180 milliliters of a culture filtrate of *Aspergillus niger* which was then adjusted to pH 2.0 and diluted to 200 milliliters. The mixture was agitated continuously at 30° C. Twenty-milliliter samples were removed at varying time intervals and centrifuged. After the supernatants were adjusted to pH 4.0, they were diluted to 50 milliliters, assayed for glucoamylase potencies and used for saccharification at a rate of 5 glucoamylase units per gram of enzymatically liquefied 30% starch pastes at 60° C. and pH 4.3. The glucoamylase recovery and dextrose equivalent (D.E.) of starch hydrolyzates were as follows:

| Treatment time with 0.2% carrageenan pH 2.0 | Percent recovery of glucoamylase | D.E. values of starch hydrolyzates | |
|---|---|---|---|
| | | 48 hours | 72 hours |
| Control (no treatment) | 100.0 | 94.9 | 94.5 |
| 10 minutes | 84.6 | 96.7 | 95.9 |
| 30 minutes | 81.6 | 97.8 | 97.5 |
| 1 hour | 77.5 | 97.4 | 98.1 |
| 2 hours | 78.6 | 98.7 | 99.7 |

The above demonstrates that by addition of 0.2% carrageenan together with pH adjustment, complete removal of transglucosidase is accomplished in 30 minutes.

Example II

Ten milliliters of a 2% solution of carrageenan was stirred into 90 milliliters of a culture filtrate of *Aspergillus awamori* var. *fumeus* and the pH adjusted to 2.0. The mixture was agitated at 30° C. and samples were withdrawn at varying time intervals, centrifuged and after the supernatants were adjusted to pH 4.0 they were used as in Example I for saccharification of enzymatically thinned 30% starch pastes.

The above procedure was then repeated except that this time a culture filtrate of *Aspergillus phoenicis* was purified. The dextrose equivalents (D.E.) of starch hydrolyzates produced by both types of enzyme solutions were as follows:

| 0.2% Carageenan in culture filtrate at pH 2.0 | Treatment time, hours | D.E. values of starch hydrolyzates | | |
|---|---|---|---|---|
| | | 48 hrs. | 72 hrs. | 96 hrs. |
| *A. awamori* var. *fumeus* | 3 | 93.8 | 93.5 | 94.6 |
| *A. awamori* var. *fumeus* | 6 | 94.2 | 95.7 | 96.7 |
| *A. awamori* var. *fumeus* | 9 | 93.7 | 96.5 | 97.0 |
| *A. awamori* var. *fumeus* | (¹) | 87.0 | 89.3 | 89.1 |
| *A. phoenicis* | 3 | 95.2 | 96.3 | 98.7 |
| *A. phoenicis* | 6 | 95.8 | 97.3 | 99.2 |
| *A. phoenicis* | 9 | 97.1 | 96.8 | 99.2 |
| *A. phoenicis* | (¹) | 91.9 | 91.9 | 93.9 |

¹ No treatment.

The ability of enzyme preparations from both *Aspergillus awamori* var. *fumeus* and *Aspergillus phoenicis* to saccharify starch was improved by the treatment.

Example III

A twenty milliliter aliquot of a glucoamylase solution derived from a culture of *Aspergillus niger* was diluted to 50 milliliters and used as a control. Four milliliters of a 1% algin solution was added to a second 20-milliliter aliquot which was then adjusted to pH 2.0 and agitated for an hour at 30° C. The mixture was then centrifuged and the supernatant solution was adjusted to pH 4.3 and diluted to 50 milliliters. The same treatment was repeated after 10 milliliters of a 1% algin solution was added to a third 20 milliliter aliquot of the glucoamylase solution. After all three diluted solutions were assayed for glucoamylase potencies they were examined for their abilities to saccharify enzymatically liquefied cornstarch paste or syrup as follows: Five glucoamylase units of each solution were added to separate 250-milliliter Erlenmeyer flasks containing 100 grams of enzymatically thinned cornstarch paste (30% solids by weight, 20 D.E., pH 4.3). The flasks were stoppered and agitated at 60° C. The glucoamylase potencies of the diluted solutions, enzyme recoveries and dextrose equivalent (D.E.) values of starch hydrolyzates at 48, 72 and 96 hours were as follows:

| Treatment | Glucoamylase units per ml. | Percent Recovery | D.E. of starch hydrolyzates | | |
|---|---|---|---|---|---|
| | | | 48 hours | 72 hours | 96 hours |
| 0.2% algin | 4.19 | 77.3 | 90.3 | 92.8 | 93.8 |
| 0.5% algin | 4.62 | 85.2 | 92.2 | 96.2 | 95.0 |
| Control (no algin) | 5.42 | 100.0 | 82.3 | 87.0 | 88.9 |

Example IV

One milliliter and two milliliters of a 1.0% solution of wheat starch sulphate were added to two 10 milliliter aliquots of a glucoamylase solution obtained from a culture of *Aspergillus niger* and in each case the pH was adjusted to 2.0 and agitated at 30° C. for an hour. The mixtures were then centrifuged and the supernatants adjusted to pH 4.3. Five glucoamylase units of each solution were used for saccharification of 100 grams of enzyme liquefied starch paste (30% solids, 20 D.E., pH 4.3) contained in 250 milliliter Erlenmeyer flasks that were agitated on a reciprocal shaker at 60° C. The 48 and 72 hour dextrose equivalent (D.E.) values were as follows:

| Treatment | D.E. of starch hydrolyzates | |
|---|---|---|
| | 48 hours | 72 hours |
| 0.1% Wheat starch sulphate | 98.3 | 97.2 |
| 0.2% Wheat starch sulphate | 98.1 | 98.3 |
| Untreated control | 95.2 | 95.1 |

Example V

Two milliliters of a 5% solution of pectin was added to a 10 milliliter aliquot of a solution of *Aspergillus niger* culture, and the pH was adjusted to 2.0. The mixture was then agitated at 30° C. for an hour and centrifuged. The supernatant was adjusted to pH 4.3 and assayed for glucoamylase potency and compared to the untreated solution for its ability to saccharify an enzymatically thinned starch paste as in the preceding example. The 24-, 48-, 72- and 96-hour dextrose equivalent (D.E.) values were as follows:

| Treatment | D.E. of starch hydrolyzates | | | |
|---|---|---|---|---|
| | 24 hours | 48 hours | 72 hours | 96 hours |
| 1% Pectin | 86.9 | 91.9 | 93.4 | 94.9 |
| Untreated control | 82.7 | 87.1 | 84.7 | 90.0 |

Example VI

Two milliliters and 5 milliliters of 1% solutions of low, medium and high viscosity carboxymethylcellulose were added to 10 milliliter aliquots of a solution of *Aspergillus niger* culture which were then adjusted to pH 2.0. The mixtures were then agitated at 30° C. for an hour and centrifuged. After the supernatants were adjusted to pH 4.3 they were assayed for glucoamylase potencies along with the untreated control and used for saccharification of enzyme liquefied cornstarch as in Example IV. The 39-, 63- and 87-hour dextrose equivalent (D.E.) values were as follows:

| Treatment | D.E. of starch hydrolyzates | | |
|---|---|---|---|
| | 39 hrs. | 63 hrs. | 87 hrs. |
| 0.2% Low viscosity carboxymethylcellulose | 97.1 | 98.6 | 97.5 |
| 0.5% Low viscosity carboxymethylcellulose | 96.3 | 96.7 | 96.3 |
| 0.2% Med. viscosity carboxymethylcellulose | 96.9 | 98.3 | 97.4 |
| 0.5% Med. viscosity carboxymethylcellulose | 96.7 | 97.1 | 97.9 |
| 0.2% High viscosity carboxymethylcellulose | 96.5 | 96.4 | 96.7 |
| 0.5% High viscosity carboxymethylcellulose | 96.6 | 98.4 | 97.9 |
| Untreated control | 92.1 | 93.3 | 93.2 |

Example VII

One milliliter and 2 milliliters of a 2% solution of di-starch phosphate were added to separate 10 milliliter aliquots of a glucoamylase solution obtained from a culture of *Aspergillus niger* and adjusted to pH 2.0. Also 2 milliliters of the same di-starch phosphate solution was added to a 10-milliliter aliquot of the enzyme solution and adjusted to pH 2.5. Three more 10-milliliter aliquots of the same enzyme solution were similarly treated with a 2% solution of mono-starch phosphate. The mixtures were all agitated at 30° C. for an hour and centrifuged.

After the supernatants were adjusted to pH 4.3 they were assayed for glucoamylase potencies along with the untreated control and used for saccharification of enzyme liquefied starch as in Example IV. The 44-hour and 68-hour dextrose equivalent (D.E.) values were as follows:

| Treatment | pH | D.E. of starch hydrolyzates | |
|---|---|---|---|
| | | 44 hours | 68 hours |
| 0.2% Di-starch phosphate | 2.0 | 93.8 | 94.7 |
| 0.4% Di-starch phosphate | 2.0 | 94.2 | 96.1 |
| Do | 2.5 | 93.3 | 93.0 |
| 0.2% Mono-starch phosphate | 2.0 | 93.1 | 96.1 |
| 0.4% Mono-starch phosphate | 2.0 | 94.2 | 97.2 |
| Do | 2.5 | 92.6 | 94.5 |
| Untreated control | | 91.0 | 92.4 |

Example VIII

One milliliter of a 2% solution of oxidized starch was added to each of two 10-milliliter aliquots of a glucoamylase solution and then adjusted to pH 2.0 and 2.2. The mixtures were agitated one hour at 30° C. and centrifuged after which the supernatants were adjusted to pH 4.3. One milliliter of the 2% solution of oxidized starch was also added to a third 10-milliliter aliquot of the same enzyme solution and adjusted to pH 2.0. After the mixture was agitated for an hour the mixture was not centrifuged but adjusted to pH 4.3. All three enzyme solutions as well as the untreated control were assayed for glucoamylase potencies and used for saccharification of enzymatically liquefied starch as in Example IV. The 24-, 48-, 72- and 96-hour dextrose equivalent (D.E.) values of the starch hydrolyzates were as follows:

| Treatment | pH | D.E. of starch hydrolyzates | | | |
|---|---|---|---|---|---|
| | | 24 hr. | 48 hr. | 72 hr. | 96 hr. |
| 0.2% Oxidized starch | [1] 2.0 | 83.3 | 91.1 | 92.2 | 95.3 |
| Do | [2] 2.0 | 86.5 | 92.6 | 93.5 | 94.8 |
| Do | [1] 2.2 | 84.8 | 89.8 | 92.5 | 92.2 |
| Untreated control | | 82.7 | 87.1 | 89.7 | 90.0 |

[1] Centrifuged.
[2] Not centrifuged.

It will be noted from the above that filtration or centrifugation of the treated enzyme preparation is not necessary in order to achieve high conversion to dextrose when the preparation is employed in the hydrolysis of starch.

Example IX

Two milliliters, 1 milliliter, 0.5 milliliter and 0.25 milliliter of a 1% oxidized starch solution were added to separate 10-milliliter aliquots of a glucoamylase solution and then adjusted to pH 2.0. The mixtures were agitated for an hour at 30° C. and centrifuged. The supernatants were then adjusted to pH 4.3 and assayed along with the untreated control for glucoamylase potencies. All of the enzyme solutions were then used for saccharification of enzyme liquefied cornstarch as in Example IV. The 48-hour and 72-hour dextrose equivalent (D.E.) values of the starch hydrolyzates were as follows:

| Treatment | D.E. of starch hydrolyzates | |
|---|---|---|
| | 48 hours | 72 hours |
| 0.025% Oxidized starch | 98.4 | 98.5 |
| 0.05% Oxidized starch | 97.8 | 98.0 |
| 0.1% Oxidized starch | 96.7 | 98.6 |
| 0.2% Oxidized starch | 97.8 | 99.2 |
| Untreated control | 92.9 | 94.2 |

The above illustrates that use of as little as 0.025% oxidized starch effectively refines a glucoamylase solution according to the process described in this invention and also that resultant starch hydrolyzates have increased dextrose content.

Example X

Sufficient quantities of polysaccharide-treated enzyme were prepared to conduct pilot plant scale starch saccharification tests. Either carrageenan or oxidized starch at a level of 0.2% was added to glucoamylase solutions derived from *Aspergillus niger* and the pH adjusted to 1.9 to 2.0. Both the carrageenan and oxidized starch were dissolved by boiling suspensions of the polysaccharide and cooling the solutions before they were added to the enzyme preparation. The polysaccharide-enzyme solution mixtures were held for one hour at 25° C., filtered and adjusted to pH 4.0. The filtrate volume from the treatment with carrageenan was 5000 milliliters and represented an 87% glucoamylase recovery. Forty-five liters of filtrate were obtained from the oxidized starch treatment which represented 61.3% glucoamylase recovery.

Following the purification treatment, the preparations were used to saccharify 50-gallon quantities of enzyme liquefied starch at 60° C. and pH 4.3 using 75 glucoamylase units per pound of starch. In the case of the carrageenan treated enzyme, the hydrolyzate contained 28.47% solids and assayed 96.2, 97.3 and 97.7 dextrose equivalent (D.E.) at 36, 60 and 72 hours, respectively. The hydrolyzate saccharified with oxidized starch treated enzyme contained 28.32% solids and assayed 94.9, 95.9 and 96.2 dextrose equivalent (D.E.) at 36, 60 and 72 hours, respectively. A control hydrolyzate similarly saccharified but with untreated enzyme contained 28.53% solids and assayed 92.6, 93.7 and 94.0 dextrose equivalent (D.E.) at 36, 60 and 72 hours, respectively.

Those modifications and equivalents which fall within the spirit of the invention and the scope of the appended claims are to be considered part of the invention.

I claim:

1. A process of purifying a transglucosidase and glucoamylase-containing fungal enzyme preparation which comprises treating said preparation in aqueous medium with an aqueous solution of a water-soluble polysaccharide material having anionic functional groups at a pH within the range from about 1.5 to 4 for a time sufficient to substantially inactivate the transglucosidase enzyme.

2. The process of claim 1 wherein the pH is maintained at about 2.0 to 3.0.

3. The process of claim 1 wherein the treatment is carried out for a period of at least about 5 minutes.

4. The process of claim 1 wherein the transglucosidase and glucoamylase-containing fungal enzyme preparation is derived from the *Aspergillus genus*.

5. The process of claim 1 wherein the transglucosidase and glucoamylase-containing fungal enzyme preparation is derived from *Aspergillus niger*.

6. The process of claim 1 wherein treatment is carried out at a temperature between about 5 and 50° C.

7. The process of claim 1 wherein the treatment is carried out at a temperature between about 20 and 40° C.

8. A process of treating a transglucosidase and glucoamylase-containing fungal enzyme preparation which comprises contacting said preparation in aqueous medium with an aqueous solution of a water-soluble polysaccharide having anionic functional groups at a temperature between about 5 and 50° C. and at a pH of from 1.5 to 4 for a time sufficient to substantially inactivate the transglucosidase enzyme, and then separating purified glucoamylase enzymes from said preparation.

9. The process of claim 8 wherein the polysaccharide treating material is employed in an amount from about 0.01 to 10.0% by weight of the fungal enzyme preparation.

10. The process of claim 8 wherein treatment is carried out at a temperature from about 20 to 40° C.

11. A process of purifying a transglucosidase and glucoamylase-containing fungal enzyme preparation which comprises treating said preparation in aqueous medium with an aqueous solution of karaya gum at a pH within the range of from about 1.5 to 4 for a time sufficient to substantially inactivate the transglucosidase enzyme.

12. A process of purifying a transglucosidase and glucoamylase-containing fungal enzyme preparation which comprises treating said preparation in aqueous medium with an aqueous solution of locust bean gum at a pH within the range from about 1.5 to 4 for a time sufficient to substantially inactivate the transglucosidase enzyme.

13. A process of purifying a transglucosidase and glucoamylase-containing fungal enzyme preparation which comprises treating said preparation in aqueous medium with an aqueous solution of carrageenan at a pH within the range from about 1.5 to 4 for a time sufficient to substantially inactivate the transglucosidase enzyme.

14. A process of purifying a transglucosidase and glucoamylase-containing fungal enzyme preparation which comprises treating said preparation in aqueous medium with an aqueous solution of algin at a pH within the range from about 1.5 to 4 for a time sufficient to substantially inactivate the transglucosidase enzyme.

15. A process of purifying a transglucosidase and glucoamylase-containing fungal enzyme preparation which comprises treating said preparation in aqueous medium with an aqueous solution of pectin at a pH within the range from about 1.5 to 4 for a time sufficient to substantially inactivate the transglucosidase enzyme.

16. A process of purifying a transglucosidase and glucoamylase-containing fungal enzyme preparation which comprises treating said preparation in aqueous medium with an aqueous solution of oxidized starch at a pH within the range from about 1.5 to 4 for a time sufficient to substantially inactivate the transglucosidase enzyme.

17. A process of purifying a transglucosidase and glucoamylase-containing fungal enzyme preparation which comprises treating said preparation in aqueous medium with an aqueous solution of starch sulphate at a pH within the range from about 1.5 to 4 for a time sufficient to substantially inactivate the transglucosidase enzyme.

18. A process of purifying a transglucosidase and glucoamylase-containing fungal enzyme preparation which comprises treating said preparation in aqueous medium with an aqueous solution of a water-soluble starch phosphate at a pH within the range from about 1.5 to 4 for a time sufficient to substantially inactivate the transglucosidase enzyme.

19. A process of purifying a transglucosidase and glucoamylase-containing fungal enzyme preparation which comprises treating said preparation in aqueous medium with an aqueous solution of carboxymethylcellulose at a pH within the range from about 1.5 to 4 for a time sufficient to substantially inactivate the transglucosidase enzyme.

20. In a process for producing dextrose from starchy materials wherein the starchy material is hydrolyzed with fungal enzymes, the improvement which consists in hydrolyzing the starchy material with a glucoamylase-containing fungal enzyme preparation which has been purified by treating said preparation in aqueous medium with an aqueous solution of a water-soluble polysaccharide having anionic functional groups at a pH of from about 1.5 to 4 for a period of time sufficient to substantially inactivate the transglucosidase enzyme.

21. In a process for producing dextrose from starchy materials wherein the starchy material is hydrolyzed with fungal enzymes, the improvement which consists in hydrolyzing the starchy material with a glucoamylase-containing fungal enzyme preparation which has been purified by treating said preparation in aqueous medium with an aqueous solution of a water-soluble polysaccharide having anionic functional groups at a temperature of from about 20 to 40° C. and a pH of from about 2.0 to 3.0 for a period of time sufficient to substantially inactivate the transglucosidase enzyme.

References Cited

UNITED STATES PATENTS 3,117,063   1/1964   Hurst et al. _____ 195—31
3,254,003   5/1966   Croxall _____ 195—66

OTHER REFERENCES

Calmon et al., editors: Ion Exchangers in Organic and Biochemistry 1957, pp. 548–563, Interscience Publishers, N.T.

Pazur et al.: Journal of Biological Chemistry, 1959, vol. 234, pp. 1966 to 1970.

A. LOUIS MONACELL, *Primary Examiner.*

L. M. SHAPIRO, *Assistant Examiner.*